US007765342B2

(12) United States Patent
Whalley et al.

(10) Patent No.: US 7,765,342 B2
(45) Date of Patent: Jul. 27, 2010

(54) SYSTEMS, METHODS, AND COMPUTER PROGRAM PRODUCTS FOR PACKING INSTRUCTIONS INTO REGISTER FILES

(75) Inventors: David Whalley, Tallahassee, FL (US); Gary Tyson, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 826 days.

(21) Appl. No.: 11/470,881

(22) Filed: Sep. 7, 2006

(65) Prior Publication Data

US 2007/0136561 A1 Jun. 14, 2007

Related U.S. Application Data

(60) Provisional application No. 60/714,959, filed on Sep. 7, 2005.

(51) Int. Cl.
*G06F 3/00* (2006.01)
*G06F 5/00* (2006.01)
*G06F 15/00* (2006.01)
*G06F 15/76* (2006.01)
*G06F 7/38* (2006.01)
*G06F 9/00* (2006.01)
*G06F 9/44* (2006.01)

(52) U.S. Cl. .......................... 710/49; 712/42; 712/244; 712/200

(58) Field of Classification Search ................ 712/220, 712/42, 200, 244; 710/49
See application file for complete search history.

(56) References Cited

U.S. PATENT DOCUMENTS 5,459,845 A * 10/1995 Nguyen et al. .............. 712/248
5,515,519 A * 5/1996 Yoshioka et al. ............ 712/234
5,819,058 A * 10/1998 Miller et al. ................ 712/210
6,199,126 B1 * 3/2001 Auerbach et al. ............. 710/68
6,892,292 B2 * 5/2005 Henkel et al. ............... 712/200

OTHER PUBLICATIONS

Hines et al, "Improving program efficiency by packing instructions into registers", Jun. 4-8, 2005, Computer Architecture, 2005, ISCA '05. Proceedings. 32nd International Symposium, pp. 260-271.*

(Continued)

*Primary Examiner*—Niketa I Patel
*Assistant Examiner*—Farley J Abad
(74) *Attorney, Agent, or Firm*—Sutherland Asbill & Brennan LLP

(57) ABSTRACT

Embodiments of the present invention may provide for architectural and compiler approaches to optimizing processors by packing instructions into instruction register files. The approaches may include providing at least one instruction register file, identifying a plurality of frequently-used instructions, and storing at least a portion of the identified frequently-used instructions in the instruction register file. The approaches may further include specifying a first identifier for identifying each of instructions stored within the instruction register file, and retrieving at least one packed instruction from an instruction cache, wherein each packed instruction includes at least one first identifier. The packed instructions may be tightly packed or loosely packed in accordance with embodiments of the present invention. Packed instructions may also be executed alongside traditional non-packed instructions. Further, the use of packed instructions and instruction register files may provide a level of indirection that enhances the security of the embodying software.

18 Claims, 12 Drawing Sheets

OTHER PUBLICATIONS

Homepage of Stephen Hines, http://ww2.cs.fsu.edu/~hines/.*

Todd Austin, et al., "SimpleScalar: An Infrastructure for Computer System Modeling", IEEE computer, 35:59-67, Feb. 2002.

Manuel E. Benitez, et al., "A Portable Global Optimizer and Linker", In Proceedings of the SIGPLAN'88 conference on Programming Language Design and Implementation, 1998, pp. 329-338.

David Brooks, et al., "Wattch: A Framework For Architectural-Level Power Analysis and Optimizations", In Proceedings of the 27th annual International Symposium on Computer Architecture, pp. 83-94, New York, NY, 2000, ACM Press.

Keith D. Cooper, et al., "Enhanced Code Compression for Embedded RISC Processors", SIGPLAN, 1999, pp. 139-149.

Marc L. Corliss, et al., "A DISE Implementation of Dynamic Code Decompression", LCTES, 2003, pp. 232-243.

Saumya K. Debray, et al., "Compiler Techniques for Code Compaction", ACM Transactions on Programming Languages and Systems, vol. 22, No. 2, Mar. 2000, pp. 378-415.

Christopher W. Fraser, et al., "Analyzing and Compressing Assembly Code", ACM SIGPLAN, Jun. 1984, SIGPLAN Notices, vol. 19, No. 6, pp. 117-121.

Ann Gordon-Ross, et al., "Tiny Instruction Caches For Low Power Embedded Systems", ACM Transactions on Embedded Computing Systems, vol. 2, No. 4, Nov. 2003, pp. 449-481.

Mathew R. Guthaus, et al., "MiBench: A Free, Commercially Representative Embedded Benchmark Suite", IEEE 4th Annual Workshop on Workload Characterization, Dec. 2001.

Johnson Kin, et al., "The Filter Cache: An Energy Efficient Memory Structure", In Proceedings of the 1997 International Symposium on Microarchitecture, pp. 184-193, 1997.

Lea Hwang Lee, et al., "Instruction Fetch Energy Reduction Using Loop Caches For Embedded Applications With Small Tight Loops", In Proceedings of the International Symposium on Low Power Electronics and Design, 1999, pp. 267-269.

Charles Lefurgy, et al., "Improving Code Density Using Compression Techniques", In Proceedings of the 1997 International Symposium on Microarchitecture, pp. 194-203. Dec. 1997.

James Montanaro, et al., "A 160 MHz, 32-b, 0.5-W CMOS RISC Microprocessor",Digital Technical Journal, vol. 9, No. 1, 1997, pp. 49-62.

David A. Padua, et al., "Advanced Compiler Optimizations for Supercomputers", Communications of the ACM, Dec. 1986, vol. 29, No. 12, pp. 1184-1201.

Heidi Pan, et al., "Heads and Tails: A Variable-Length Instruction Format Supporting Parallel Fetch and Decode", CASES'01, Nov. 16-17, 2001, Atlanta, Georgia, USA. Copyright 2001, ACM 1-58113-399-5/01/0011, pp. 168-175.

Karl Pettis, et al., "Profile Guided Code Positioning", ACN 0-89791-364-7/90/0006/0016, 1990, pp. 16-27.

Simon Segars, et al., "Embedded Control Problems, Thumb, and the ARM7TDMI", IEEE Micro, 1995, pp. 22-30.

Nancy J. Warter, et al., "Enhanced Modulo Scheduling for Loops With Conditional Branches", IEEE, 1992, pp. 170-179.

Steven J.E. Wilton, et al., "CACTI: An Enhanced Cache Access and Cycle Time Model", IEEE Journal of Solid State Circuits, 1996, pp. 1-26.

* cited by examiner

| A) Instructions | B) Packed/Instructions | C) Re-assigned Instructions | D) Packed/Instructions |
|---|---|---|---|
| .L164:<br>lw $8,0($14)<br>lw $3,0($12)<br>slt $1,$3,$8<br>beq $1,$0,.L165  # IRF (2)<br>                         # IRF (4) +<br>                         # IMM (.L165) | .L164:<br>lw $8,0($14) {2}<br>slt $1,$3,$8<br>beq $1,$0,.L165 | .L164:<br>lw $2,0($14)<br>lw $3,0($12)<br>slt $1,$3,$2<br>beq $1,$0,.L165  # IRF (1)<br># IRF (2)<br># IRF (3)<br># IRF (4) +<br># IMM (.L165) | .L164:<br>param4d{1,2,3,4,.L165} |
| sw $3,0($14)  #<br>sw $8,0($12)  # | sw $3,0($14)<br>sw $8,0($12) | sw $3,0($14)<br>sw $2,0($12)  # IRF (7) | sw $3,0($14) {7} |
| .L165:<br>...<br>bne $1,$0,.L164  # | .L165:<br>...<br>bne $1,$0,.L164 | .L165:<br>...<br>bne $1,$0,.L164  # | .L165:<br>...<br>bne $1,$0,.L164 |

FIG. 5

```
if blk→slots == 0 then
    if blk→prev_packable and an IRF insn is in ready set then
        schedule the IRF insn next
    else if 3 or more IRF slots are in ready set then
        schedule an IRF_param or IRF insn next
    else if IRF insn and packable insn are in ready set then
        schedule a loose pack with the packable insn and the
        IRF insn
if no instructions have been scheduled yet then
    if (blk→prev_packable or blk→slots == 4) and an IRF insn exists
    in ready set then
        schedule the IRF insn next
    else if 1 ≤ blk→slots ≤ 3 and any IRF insns in ready set then
        schedule an IRF_param or IRF insn next
    else if a non-IRF insn exists in ready set then
        schedule the non-IRF insn
    else
        schedule the first IRF_param or IRF insn next
Update blk→prev_packable and blk→slots based on the
scheduled instruction(s)
```

FIG. 6

Inter-block Scheduling

```
irf_intra_sched(entry_blk)
foreach blk that is a loop header do
    irf_intra_sched(blk)
while all blocks have not been scheduled do
    blk = next block with all preds scheduled
    // Predication
    if blk is fall through from branch and has no other preds
    then
        if predecessor has empty slots after branch then
            attempt to move IRF insns from blk into the
            slots
    // Duplication
    ok = TRUE
    foreach pblk ∈ blk→preds do
        if pblk is unscheduled or pblk→left ≠ blk
        or pblk has no slots then
            ok = FALSE
    if ok then
        slots = minimum of available slots from all pre-
        decessors
        foreach pblk ∈ blk→preds do
            attempt to move IRF insns from blk into the
            slots
            irf_intra_sched(pblk)
    irf_intra_sched(blk)
    // Backward Branch Packing
    if blk branches back to loop header toblk then
        slots = minimum of slots from toblk preds in-
        cluding blk
        foreach pblk ∈ toblk→preds do
            attempt to move IRF insns from toblk into
            the slots
            irf_intra_sched(pblk)
    mark blk as scheduled
```

FIG. 12

SYSTEMS, METHODS, AND COMPUTER PROGRAM PRODUCTS FOR PACKING INSTRUCTIONS INTO REGISTER FILES

RELATED APPLICATIONS

The present invention claims benefit of U.S. Provisional Application Ser. No. 60/714,959, filed Sep. 7, 2005, and entitled "Systems, Methods, and Computer Program Products for Packing Instructions," which is hereby incorporated by reference in its entirety as if fully set forth herein.

STATEMENT OF GOVERNMENT INTEREST

This invention was made with Government support under CCR0208892 and EIA0072043 awarded by the National Science Foundation. The Government has certain rights in the invention.

FIELD OF THE INVENTION

The invention relates generally to processors, and more particularly to architectural, compiler, and security approaches involving the packing of instructions into instruction register files.

BACKGROUND OF THE INVENTION

Embedded systems are subject to a variety of design constraints. Performance must be sufficient to meet the timing constraints for the application. Power consumption should be minimized, often to be less than a specified target. The size of read-only memory (ROM) may have rigid limits to minimize cost. Unfortunately, it is often difficult to improve one parameter without negatively affecting others. For example, increasing clock frequency to enhance performance also increases energy consumption. Likewise, code compression techniques may improve the code density, but may increase the execution time. In addition, voltage scaling reduces energy consumption, but at the cost of increased execution time. While energy consumption, code size, and execution time has been the prevailing design environment for embedded processors, the same design constraints may also apply to general-purpose processor design as well.

SUMMARY OF THE INVENTION

According to an embodiment of the present invention, there is a computerized method of optimizing processors. The method includes providing at least one instruction register file, identifying a plurality of frequently-used instructions, and storing at least a portion of the identified frequently-used instructions in the instruction register file. The method further includes specifying a first identifier for identifying each of the instructions stored within the instruction register file, and retrieving at least one packed instruction from an instruction cache, where each packed instruction includes at least one first identifier.

According to an aspect of the present invention, the first identifier may include an index specifying one of the plurality of instructions stored within the instruction register file. According to another aspect of the present invention, the method may further include identifying a plurality of frequently-used immediate values and storing at least a portion of the identified frequently-used immediate values in an immediate table. The method may further include specifying a second identifier for identifying each of the plurality of immediate values stored in the immediate table, where at least one packed instruction includes a second identifier. According to yet another aspect of the present invention, at least one packed instruction may include a second identifier associated with the first identifier, where the second identifier identifies an immediate value stored in an immediate table.

According to another aspect of the present invention, at least one of the packed instructions may include a plurality of first identifiers. According to another aspect of the present invention, the instruction cache may include one or more of an L1 instruction cache and a ROM. According to still another aspect of the present invention, a first format of the instructions stored in the instruction register file may be different from a second format of the instructions stored in the instruction cache. According to another aspect of the present invention, the instruction register file may includes a plurality of data registers for storing the frequently-used instructions and at least one frequently-used instruction in the instruction register file may identify a data register by a position of a previous instruction relative to a position of a current instruction of the instruction cache. According to yet another aspect of the present invention, one of the frequently-used instructions stored in the instruction register file may include a no operation (nop) instruction.

According to another embodiment of the present invention, there is a computer-implemented method for packing instructions. The method includes partitioning an application having a plurality of instructions, identifying a set of frequently-used instructions for each partition, and storing each set of frequently-used instructions within each partition in one of a plurality of instruction windows. The method further includes specifying, within each instruction window, an identifier for each instruction stored in the instruction window, and providing one or more packed instructions for each partition, where each packed instruction includes at least one identifier corresponding to a frequently-used instruction stored in each instruction window for the corresponding partition.

According to an aspect of the present invention, at least one instruction window may be associated a plurality of hardware registers. According to another aspect of the present invention, the plurality of hardware registers may form an instruction register file. According to another aspect of the present invention, the method may further include providing at least one pointer specifying one of the plurality of instruction windows. At least one packed instruction may include a pointer to one of the plurality of instruction windows. According to yet another aspect of the present invention, the at least one instruction window may be implemented with software.

According to yet another embodiment of the present invention, there is a computer-implemented method for providing secure software. The method includes providing a plurality of instruction register file (IRF) instructions, specifying a first identifier for each IRF instruction in the instruction register file, and providing memory instructions that include one or more packed instructions, where the packed instructions include at least one first identifier. The method farther includes packaging the plurality of IRE instructions and the memory instructions into at least one first distribution file.

According to an aspect of the present invention, the method may further include packaging the IRF instructions and the memory instructions into at least one second distribution file, wherein an ordering of IRF instructions of the first distribution file is different from an ordering of IRF instructions of the second distribution file. According to another aspect of the present invention, one of the plurality of IRF instructions for the instruction register file may include a no operation (nop)

instruction. According to yet another aspect of the present invention, an intrusion detection module may be provided for determining when an IRF instruction is not accessed via a first identifier.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 illustrates an exemplary register re-assignment in accordance with an embodiment of the present invention.

FIG. 6 illustrates an exemplary algorithm for scheduling instruction register file (IRF) instructions according to an embodiment of the present invention.

FIG. 12 illustrates an exemplary instruction scheduling algorithm for improving pack density in accordance with an embodiment of the present invention.

DETAILED DESCRIPTION OF THE INVENTION

Embodiments of the present invention may provide for micro-architectural designs, instruction set design improvements, and/or compiler optimizations for meeting varying constraints associated with energy consumption, code size, and execution time. The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A. System Overview

Figure 1:
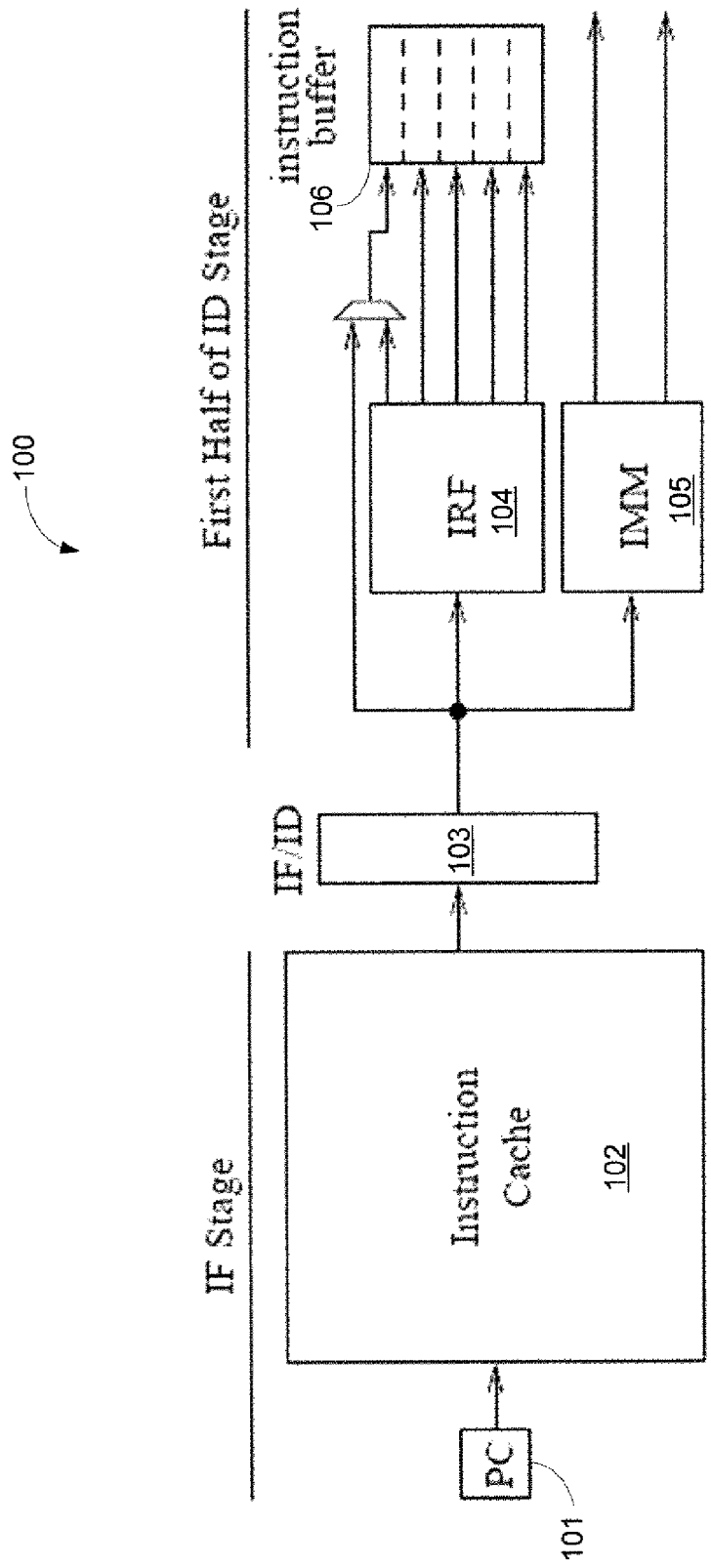
FIG. 1 shows a system for utilizing instructing packing methods in accordance with an embodiment of the present invention.

Embodiments of the present invention may utilize instruction packing methods for meeting design constraints of one or more of energy consumption, code size, execution time, and enhanced security. FIG. 1 illustrates an exemplary system 100 for utilizing such instruction packing methods in accordance with an embodiment of the present invention.

Referring to FIG. 1, there is a program counter (PC) 101, an instruction cache 102, an instruction fetch/instruction decode (IF/ID) module 103, an instruction register file (IRF) 104, an immediate table (IMM) 105, an instruction table 105, and an instruction buffer 106. During operation of the system 100, the PC 101 may hold an address for the instruction to be fetched from the instruction cache 102, which may be implemented using memory such as L1 instruction caches, ROMs, and the like known to those of ordinary skill in the art. Instructions referenced or addressed from instruction cache 102 may also be referred to as "memory ISA (instruction set architecture)" or "MISA" instructions. As will be described in further detail below, these MISA instructions stored in the instruction cache 102 may be packed according to various embodiments of the present invention. According to an embodiment of the present invention, the MISA instructions may, via the IF/ID module 103, reference one or more instructions stored in the instruction register file 104, which may also be referred to as "register ISA" or "RISA" instructions. The instruction register file 104 may contain registers that store frequently accessed or referenced RISA instructions. According to an embodiment of the present invention, the instruction register file 104 may be a 32-instruction register file, although one of ordinary skill will recognize that fewer or more than 32-instructions may be utilized as necessary (e.g., 16-instructions, 64-instructions, etc.). The instruction register file 104 may be implemented using one or more random access memory (RAM) structures, which may be one or more SRAM structures. Many memory structures for register file 104 are known to those of ordinary skill in the art and may be equally utilized without departing from embodiments of the present invention. Instructions retrieved for decoding from the instruction register file 104 may be placed in the instruction buffer 106 for execution.

In addition to the instruction register file 104, the system 100 also includes an immediate table 105, which may include commonly used immediate values in the program. Like the instruction register file 104, the immediate table 105 may be implemented using SRAM structures or other similar memory structures. According to an embodiment of the present invention, there may be 32 immediate values in the immediate table 105, although fewer or more than 32 immediate values may be utilized. In addition to the RISA instructions described above, the MISA instructions stored in the instruction cache 102 may also reference one or more immediate values from the immediate table 105.

One of ordinary skill in the art will recognize that many variations of the system 100 are possible. For example, while the instruction fetch/instruction decode stages have been illustrated as consecutive stages of a single IF/ID module 103, the instruction fetch/instruction decode stages may be separated by intervening stages. According to an alternative embodiment of the present invention, the instruction register file 104 may be placed at the end of the instruction fetch stage instead of at the end of the instruction decode stage. Further alternative embodiments of the present invention may store partially decoded instructions in the instruction register file 104, perhaps if the decode stage is on the critical path of the processor implementation.

B. Instruction Packing Format

As described with reference to FIG. 1, the MISA instructions stored in the instruction cache 102 may be stored in a packed instruction format according to an embodiment of the present invention. The packed instruction format may allow multiple RISA instructions to be specified using a single packed MISA instruction.

Figure 2:
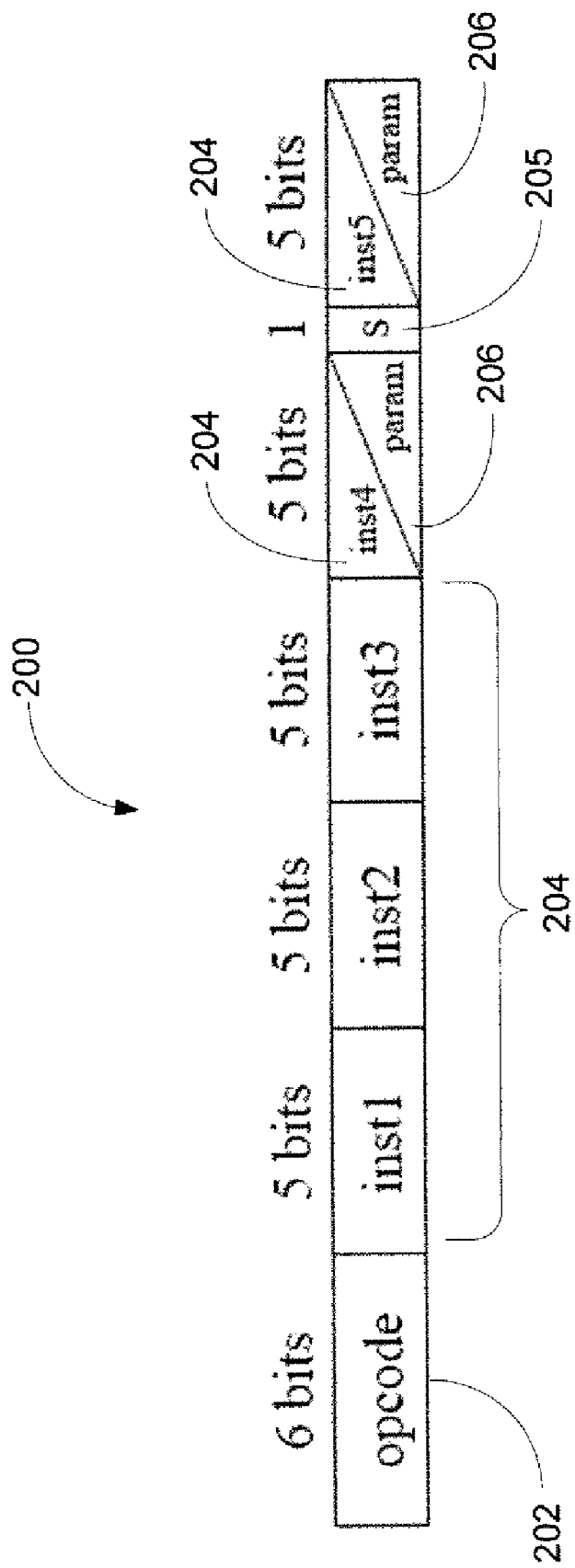
FIG. 2 illustrates an exemplary packed instruction format in accordance with an embodiment of the present invention.

FIG. 2 illustrates an embodiment of a packed MISA instruction format 200, which may also be referred to as a "tightly packed" instruction format. As shown in FIG. 2, the packed MISA instruction format 200 may be a 32-bit instruction format, although fewer or more bits may also be utilized without departing from embodiments of the present invention. More specifically, FIG. 2 illustrates a tightly packed instruction format 200 that includes an operation code (op-code) field 202, one or more instruction identifiers 204, and optionally an S-bit 205 and one or more parameter identifiers 206

Each respective instruction identifier 204 of FIG. 2 may be used to reference a particular RISA instruction stored in the instruction register file 104. In particular, the instruction identifier 204 may include a small register specifier used to index the RISA instructions stored in the instruction register file 104. For example, if the instruction register file 104 includes 32-instructions, then the small register specifier may be 5-bits. Similarly, the instruction identifier 204 may include at least 5 bits to accommodate the 5-bit small register specifier. Accordingly, the use of these small register specifiers for the instruction identifiers 204 may allow multiple USA instructions to be specified (e.g., "packed") within a single MISA instruction fetched from the instruction cache 102.

In addition to specifying one or more instruction identifiers 204, the tightly packed instruction format 200 may optionally include one or more parameter identifiers 206. The parameter identifier 206 may reference, perhaps via an index value, a particular immediate value from the immediate table 105. If the immediate table 105 includes 32 entries, then the parameter identifier 206 may be at least 5-bits, as illustrated in FIG. 2. According to an aspect of the invention, additional instruction opcodes 202 and/or other instruction bits such as S-bit 205 within the tightly packed instruction format 200 may specify which instruction corresponding to a particular instruction identifier 204 utilizes the specified parameter identifier 206 for the immediate value in the immediate table 105. In addition or in the alternative, default immediate values for instructions specified by the instruction identifiers 204 may be utilized where no immediate values are specifically provided for. Further, as illustrated in FIG. 2, an instruction identifier 204 may be substituted for a parameter identifier 206 without departing from embodiments of the present invention.

According to an exemplary embodiment of the present invention, the tightly packed instruction format 200 may be a 32-bit instruction format utilized with a MIPS ISA according to an exemplary embodiment. One of ordinary skill in the art will recognize that the format of the MISA instructions fetched from the instruction cache 102 may be different from the format of the RISA instructions stored in the instruction register file 104. In addition or in the alternative, an instruction in the instruction register file 104 may identify a data register by the distance between a prior use in a previous instruction and the current instruction.

In addition to a tightly packed instruction format, the instruction sets in accordance with embodiments of the present invention may additionally or alternatively be extended to support a "loosely packed" instruction format. A standard MIPS instruction may generally be modified to include at least 5 bits available for an additional RISA reference analogous to instruction identifier 204 in FIG. 2. For instance, an immediate value field of a MIPS instruction may be reduced from 16 bits to 11 bits such that 5 bits may specify an instruction register. Accordingly, the RISA instruction may be executed following the original MISA instruction, thereby allowing two instructions to be fetched for the price of one. If no meaningful RISA instruction is to be executed or specified by the MISA instruction, then the entry in the instruction register file 104 corresponding to a nop (no operation) is used or referenced in the MISA instruction. Accordingly, there is no performance penalty if the RISA reference in the MISA instruction is a nop, since no instruction will be executed from the instruction register file 104 and fetching will continue as normal. While a goal of the tightly packed instruction format 200 is the improved fetch of frequently executed instruction streams, the loosely packed instruction format helps in capturing the same common instructions when they are on infrequently executed paths and not surrounded by other packable instructions.

Figure 3:
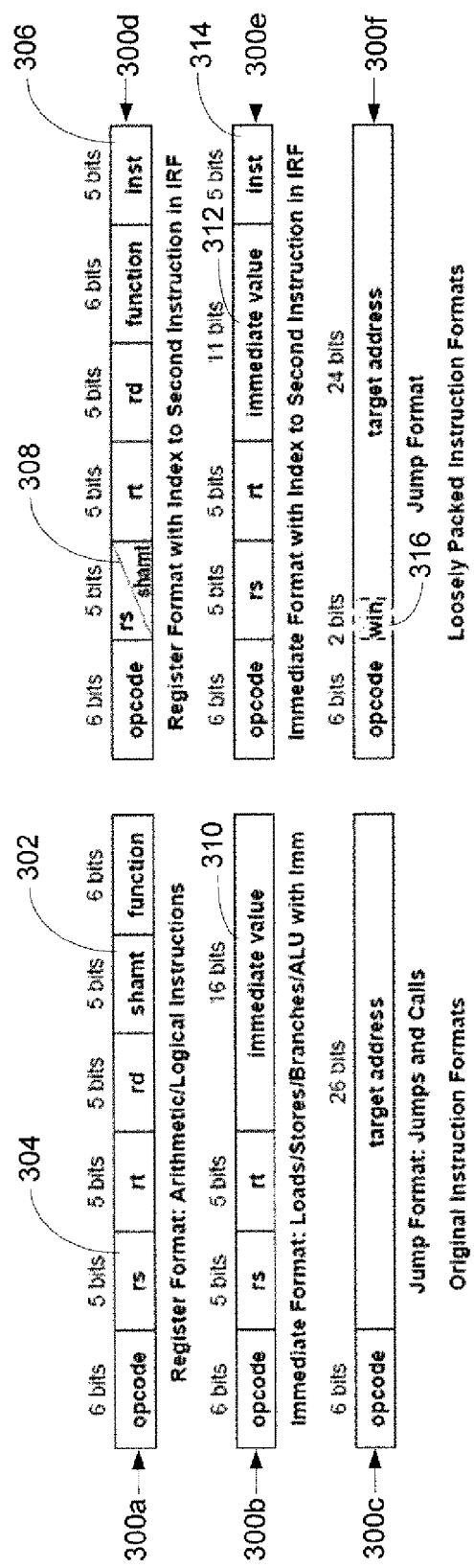
FIG. 3 illustrates differences between original MIPS instruction formats and exemplary loosely packed instruction formats in accordance with an exemplary embodiment of the present invention.

FIG. 3 shows the differences between original MIPS instruction formats 300a-e and exemplary loosely packed MISA instruction formats 300d-f. With R-type instructions, as in instruction formats 300a and 300d, the shamt field 302 can be used for a RISA reference (see inst field 306 of instruction format 300d) and the shift amount previously specified in shamt field 302 can now be specified in the combined rs/shamt field 308. With I-type instructions, as in instruction formats 300b and 300e, immediate values in I-type instructions are reduced from 16 bits (see immediate value field 310 of instruction format 300b) to 11 bits (see immediate value field 312 of instruction format 300e) to make room for a RISA reference (see inst field 314 of instruction format 300e). The lui (load upper immediate) instruction is the only I-type that is adjusted differently, in that it now uses only a single register reference and the remaining 21 bits of the instruction for the upper immediate portion. This provides a simple method for creating 32-bit constants using the lui with 21 bits for an immediate and another I-type instruction containing an 11 bit immediate value.

In order to more effectively pack instructions for applications with diverse function and phase behavior, the instruction register file 104 may be extended to support a plurality of windows, which may be hardware windows according to an exemplary embodiment of the present invention. If the windows are implemented in hardware, then registers and pointers specifying each instruction register file 104 window may be utilized. Using windows for the instruction register file 104 may increase the size of the instruction register file 104 without requiring changes to the packed instruction formats, which as described above may be tightly or loosely packed. Accordingly, if there are 4 windows with up to 32 instruction registers per window, then there are may be a total of 128 available physical instruction registers according to an exemplary embodiment of the present invention. Only 32 of these registers are accessible at any single point in time based upon a particular window, however, so the remaining 96 registers can be kept in a stand-by mode, perhaps in a low-power mode in which they retain their values but cannot be accessed. On a function call and/or return, the target address uses a win field 316 illustrated in FIG. 3, which may be 2 bits according to an exemplary embodiment of the present invention, to distinguish which instruction window to be accessed. All function addresses are updated at link-time according to which window of the instruction register file 104 they will access. Likewise, according to an exemplary embodiment of the present invention, the immediate table 105 for each instruction register file 104 window described above may be the same. However, other embodiments of the present invention may similarly utilize a plurality of windows for the immediate table 105 as well.

Many other modifications of the packed instruction formats are available. For example, while the packed instruction formats have been described with respect to 32-bit examples, embodiments of the present invention similarly apply to smaller and larger instruction formats, perhaps to 64-bit and larger formats. In addition, in alternative embodiments of the present invention, packed instructions that are currently terminated by a conditional branch may be modified. Currently, such packed instructions that are terminated by a conditional branch are not followed by any instructions. However, in accordance with embodiments of the present invention, such packed instructions terminated by a conditional branch may now be followed by a RISA instruction that should execute only if the branch is not taken. This form of instruction predication may not result in a code size increase. According to another alternative embodiment of the present invention, the instruction file can be split into at least two files—the opcodes can be placed in a first file and the associated operands can be placed in a second file. The plurality of opcodes can be indexed by a first identifier and the plurality of operands can be indexed by a second identifier. A packed instruction can then include one or more first identifiers and one or more associated second identifiers.

C. Optimizing for Instruction Packing

Figure 4:
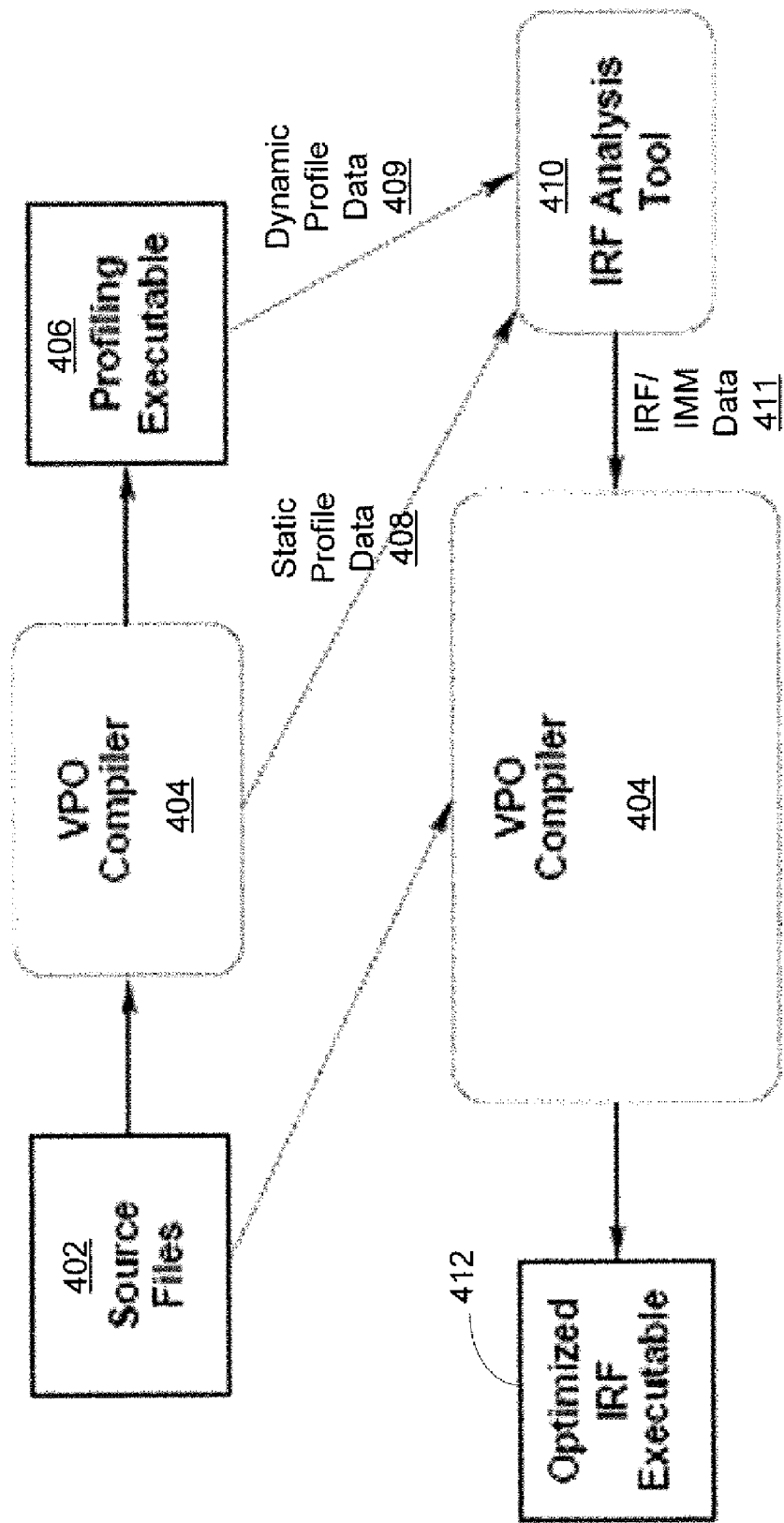
FIG. 4 illustrates an exemplary flow diagram of an operation for compiling code to support instruction packing in accordance with an exemplary embodiment of the present invention.

FIG. 4 illustrates an exemplary flow diagram of operations for compiling code to support instruction packing within an instruction register file 104. In particular, FIG. 4 illustrates the exemplary process for optimizing source files 402 and generating one or more corresponding optimized instruction register file (IRF) executables 412. More specifically, as shown in FIG. 4, the source file 402, which may be a C source file, is initially provided to a Very Portable Optimizer (VPO) Compiler 404. The VPO Compiler 404 provides static profile data (e.g., those instructions that comprise the greatest portion of the source file 402) to the IRF Analysis Tool 410, which as described in further detail below is an IRF selection and layout tool. Additionally, the VPO Compiler 404 is in communication with a profiling executable module 406 which based upon a profiled run, provides dynamic profile data 409 to the IRF Analysis Tool 410. The dynamic profile data 409 may exposes the kernel loops of the application, and thus, the most frequently executed instructions from these loops. The IRF Analysis Tool 410 then analyzes one or both of the static profile data 408 and the dynamic profile data 409, and provides the resulting IRF/IMM data 411 to the VPO Compiler 404. The IRF/IMM data 411, may determine which instructions are promoted to the instruction register file 104 and which immediate values are promoted to the immediate table 105. In addition, the VPO Compiler 404 may further perform one or more of instruction scheduling, instruction register file (IRF) 104 instruction selection, IRF 104 register re-assignment, IRF 104 intra-block instruction scheduling, and IRF 104 inter-block instruction scheduling. The resulting optimized IRF executable 412 may then be generated by the VPO Compiler 404. The operations of the IRF Analysis Tool 410 and the VPO Compiler 404 introduced with respect to FIG. 4 will now be described in further detail below.

1. Promotion of Instructions to the Instruction Register File and Immediate Values to the Immediate Table by the IRF Analysis Tool Instruction promotion is the process of selecting which instructions should reside in each instruction register file 104 window, as well as which immediate values should reside in the immediate table 105. In accordance with an embodiment of the present invention, the IRF Analysis Tool 410 (e.g., a selection and layout toot) may perform such an instruction promotion process by analyzing the static profile data 408 and/or the dynamic profile data 409. Functions are partitioned and certain instructions are placed into statically allocated instruction register file 104 windows by the IRF Analysis Tool 410 according to a selection algorithm, which may include a greedy algorithm. This algorithm may operate by estimating the potential cost/benefit of packing the instructions of a function into each particular instruction register file 104 window, and then greedily selecting the most beneficial function to assign to a window until each function has been allocated.

According to an exemplary embodiment of the present invention, the benefit of promoting an instruction to the instruction register file 104 may be determined by the IRF Analysis Tool 410 by quantifying the possible potential improvement, perhaps based upon both of code size and fetch energy requirements. For instance, a tightly packed instruction cannot achieve any further benefit, so its potential improvement is 0. A parameterized packable instruction, which utilizes the immediate table 105, has a potential improvement of 1, since it could be promoted with its immediate value as the default. A loosely packable instruction has a potential improvement of 3, since it normally would occupy approximately 4 of the slots in a MISA instruction, with the remaining slot available for a single RISA reference. Finally, an instruction that is not loosely packable like lui has a potential improvement of 4, since packing it into a single RISA entry will free up 4 additional slots in the MISA instruction. By calculating the potential improvements in this manner, means are provided for multiple I-type instructions that differ only in default immediate value to reside in the instruction register file 104 simultaneously. This allows each entry to remain loosely packable, which can be beneficial if each operation occurs very frequently. While the embodiment above has been discussed with respect to promoting an instruction to the instruction register file 104 based upon both of code size and fetch energy requirements, other embodiments may determine promotion based solely upon either code size or fetch energy requirements.

In addition, the promoting of an instruction may be based upon an analysis of static profile data 408, dynamic profile data 409, or a combination thereof. More specifically, dynamic profiling using dynamic profile data 409 may exposes the kernel loops of the application, and correspondingly the most frequently executed instructions from these loops. On the other hand, static profiling using static profile data 408 may likewise reveal those instructions that that comprise the greatest portion of the application's code. Further, a combination of dynamic profiling and static profiling may yield an adequate balance between code size savings and energy reduction, especially when dealing with a highly constrained embedded design space.

2. Instruction Selection by the VPO Compiler

As described above, the VPO Compiler 404 may perform an instruction selection process, which may include choosing or selecting which instruction or instruction sequence to use for a particular semantic operation. The VPO compiler 404 may operate on register transfer lists (RTLs) that have a one-to-one correspondence with machine instructions. In accordance with an embodiment of the present invention, instruction selection can be modified to increase the amount of redundancy in the code without negatively impacting code size or performance.

There are several methods for using instruction selection according to embodiments of the present invention. First, equivalent parameterizable operations can be chosen to replace simple operations, such as encoding move operations as additions with 0. Second, commutativity rules may be applied to make sure that all semantically equivalent instruction instances use the same order for operands. Third, parameterization may be applied to the destination registers of R-type instructions, which were previously unable to be parameterized.

Choosing equivalent parameterizable instructions over simple instructions is a transformation technique that can be applied to instruction packing in accordance with an embodiment of the present invention. The benefits of these transformations in increasing the instruction redundancy within an application may be quantified. Most of the equivalence transformations may occur for the mov and li pseudo-instructions. Register moves may be normally performed using the addu instruction with the hard-wired register zero as the second source argument. Instruction selection may instead generate this operation as an addiu instruction with zero as the immediate operand in accordance with an embodiment of the present invention. Load immediate instructions with small constants may interchangeably be generated as addiu instructions or ori instructions that use register zero as their first source operand. To increase code redundancy, the profiling pass may convert these instructions to an addiu format. Each of these transformations may increase the number of opportunities that parameterization will have for packing various sequences of instructions.

Simple transformations may also be used to increase redundancy by reducing or completely eliminating instruction diversity. The native MIPS ISA may use PC-relative addressing for branches and absolute addressing for jumps. However, absolute addressing may pose problems with instruction packing, since there can be quite a diverse set of jump target addresses. To increase the ability for frequent jumps to be placed in the instruction register file 104, short distance jumps (−16 to +15 instructions) may be converted into branches that compare register zero to itself in accordance with an embodiment of the present invention. These instructions can then be parameterized in the same manner as conditional branches. If short distance jumps occur frequently in the application, then only a single RISA entry is necessary to parameterize each of them.

Transformations may also be applied to place the operands for commutative operations in the same order for each instruction. If the destination register is also a source register, then that register is placed first in the operand list. If all registers are different, then the operands may be ordered from lowest to highest number. This transformation may unify equivalent commutative operations to further increase the level of instruction redundancy. In addition to parameterization of I-type RISA instructions to the instruction register file 104, embodiments of the present invention may also provide for parameterization to R-type destination registers. The parameterization of R-type destination registers may operate by consuming an additional RISA slot in the tightly packed instruction format to specify the replacement value (5 bits) for rd. The requirements for supporting such a feature may be minimal, as the existing parameterized instructions may not require any modifications. Only a small amount of additional hardware may be necessary, primarily in the form of multiplexers going to the instruction decoder (see, e.g., instruction fetch/instruction decode module 103).

3. Register Re-Assignment by the VPO Compiler

Compilers often attempt to minimize register usage in order to keep additional registers available for further optimizations. Since the VPO compiler 404 applies optimization phases repeatedly, it also rigorously attempts to minimize the number of distinct registers used in each particular function, This strategy may lead to different register usage patterns in the generated code for similar but slightly different functions due to the varying register pressure.

A small difference in register numbering can eliminate the possibility of instruction packing for a sequence of instructions. Although the instruction register file 104 supports a limited ability to parameterize registers, register re-assignment can be beneficial by replacing entire register live ranges. With re-assignment in accordance with an embodiment of the present invention, these registers can be adjusted to match existing instruction register file 104 instructions, leading to increased pack density. Thus, in accordance with an embodiment of the present invention, registers may be re-assigned to make instructions match existing instruction register file 104 entries when possible. Alternative embodiments of the present invention may involve renaming register files.

The instruction register file 104 register reassignment algorithm in accordance with an embodiment of the present invention may use a register interference graph to calculate the entire inter-block live range span for each register. When constructing the register interference graph, registers that are used and set within a single RTL are split into two distinct live ranges. This splitting may allow registers to be reassigned in a more fine-grained manner than the merging of these live ranges would have allowed. Shorter live ranges may have reduced potential for conflicts, which may limit the effectiveness of such a transformation. A greedy algorithm may be utilized in accordance with an embodiment of the present invention for selecting the candidates for register re-assignment. Basic blocks may be ordered from most frequently executed to least frequently executed based on the dynamic profile data 409. With this information, each potential re-assignment may be examined, perhaps individually. Live ranges of registers that cannot be altered (e.g., calling conventions) may be marked so they are not re-assigned in any manner. Since multiple renames may not be performed simultaneously, it may first be verified that the target register that is to be re-assigned is not live at any adjacent node in the graph. Using the register interference graph, the register substitution may be performed on the appropriate portion of each given RTL. Note that it may not be possible to change all references when splitting uses and sets within a single RTL into multiple live ranges of the same register number.

FIG. 5 illustrates an exemplary register re-assignment in accordance with an embodiment of the present invention. The code is a single loop with an if statement guarding two store instructions. Column A shows the component instructions 502 in the code sequence along with any relevant data 504 regarding the instruction register file 104 entry numbers of the packable instructions. Note that the instruction register file 104 contents may already determined at this point, and any unmarked instruction may not be available via the instruction register file 104. The overall packing of the entire loop, assuming that no other transformations are applied, is shown by the packed instructions 506 in column B. If register re-assignment is performed on the code, then we may obtain the code 508 shown in column C. Column D shows the re-assigned code 510 after packing the instructions. The result shown as re-assigned code 510 is that the first two blocks of the original loop that required five MISA instructions (see instructions 502) may now be accomplished in two MISA instructions.

4. Instruction Scheduling by the VPO Compiler

Instruction scheduling is an optimization that involves reordering the instructions in a basic block in an attempt to eliminate pipeline stalls due to long operation dependences. The actual scheduling often employs a directed acyclic graph (DAG) to maintain instruction dependence relationships.

Once the DAG is constructed, instructions may be issued based on priorities relating to future dependences. Instructions that have no incoming arrows in the DAG are considered to be in the ready set, as they have no dependences on which to wait. Packing multiple RISA instructions into a single MISA instruction is somewhat similar to very-long instruction word (VLIW) scheduling. In addition to physical hardware constraints, the instructions in a VLIW word may be executed simultaneously, so dependences may have to be placed in separate VLIW words, leading to a great deal of fragmentation.

Scheduling for the instruction register file 104 in accordance with an embodiment of the present invention may resemble VLIW instruction scheduling, but a difference is that dependent instructions can be packed together in a single pack, since the individual RISA references will still be sequentially issued.

FIG. 6 illustrates an exemplary algorithm for scheduling instruction register file 104 instructions within a basic block. More specifically, FIG. 6 illustrates an exemplary greedy algorithm that may be based on several heuristics for producing dense sequences of packed instructions. The algorithm may be invoked iteratively using a ready set until all instructions have been scheduled for the current block. The ready set from which selection occurs may be sorted with respect to minimizing stalls due to instruction dependences. Thus, the dependence between instructions may acts as the tie-breaker for selecting which instruction register file (IRF) 104 or non-IRF instruction should be scheduled next. According to an exemplary embodiment of the present invention, priority may be given to loose packs between instructions that do not exist in the instruction register file 104 and tightly packable RISA references. If three or more RISA reference slots (both instruction register file 104 instructions and parameters) are available, then a tightly packed instruction may be started instead. When issuing into a started tightly packed instruction, the parameterized references may be attempted to be scheduled first, since they require two slots and may not be able to be loosely packed. If the parameterized references cannot be scheduled into a loosely pack or a tightly pack instruction, then the non-IRF instructions may be attempted to be scheduled next. This allows us to potentially free up dependent instruction register file 104 instructions for packing on future iterations. Finally, instruction register file (IRF) 104 instructions may be scheduled if there are no ready non-IRF instructions. After choosing an instruction or instruction sequence for scheduling, the prev packable and slots fields in the basic block structure may be updated appropriately.

Figure 7:
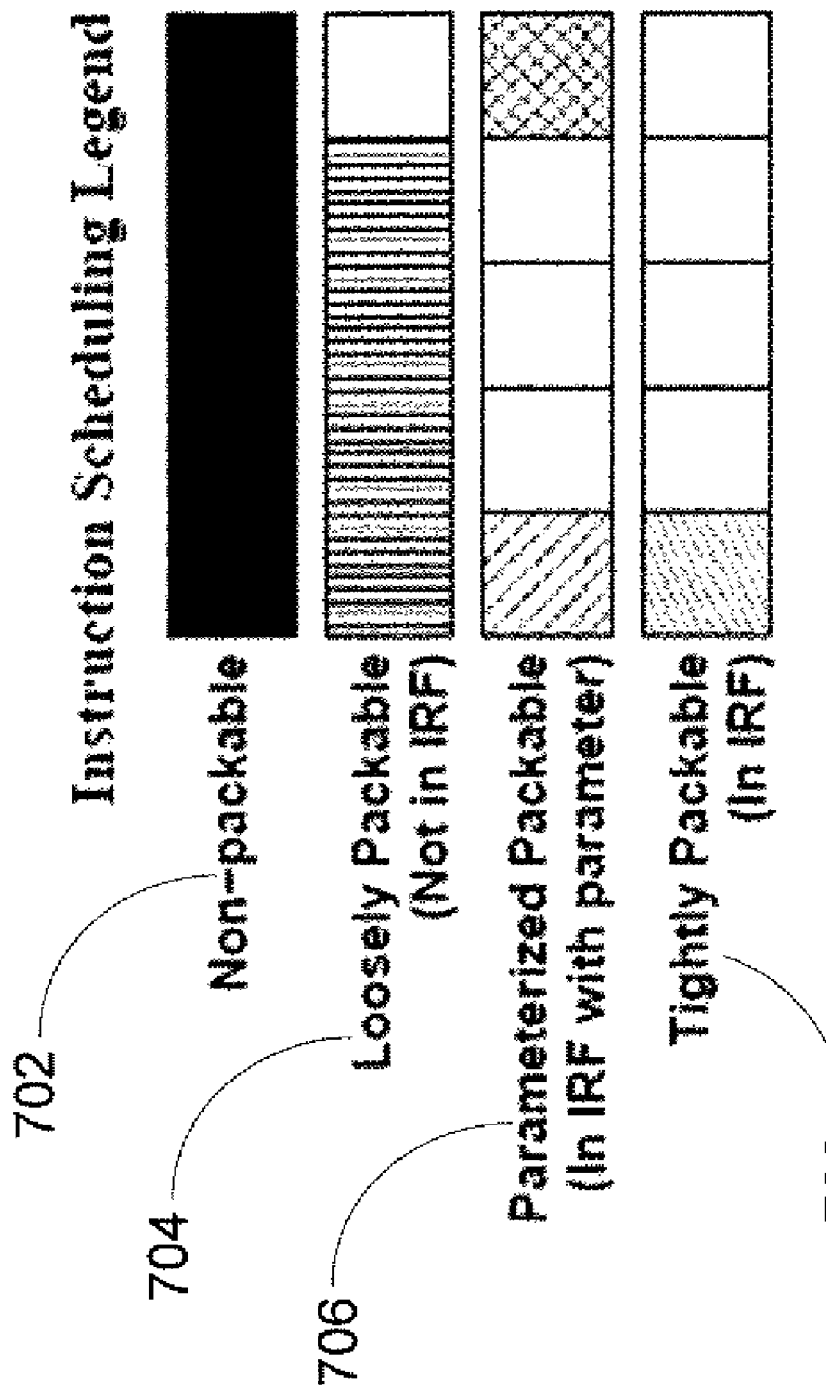
FIG. 7 illustrates an exemplary legend of instructions types for FIGS. 8-11, in accordance with an embodiment of the present invention.

FIG. 7 illustrates an exemplary legend of instruction types used for FIGS. 8-11. Colored boxes may refer to used portions of the instruction format. Empty boxes may denote unused RISA slots. Non-packable 702 refers to instructions that cannot support a loosely packed RISA reference and are not available via the instruction register file 104 themselves (e.g., jal). A non-packable 702 instruction occupies the space for all 5 RISA slots, and so there are none available for packing. Loosely packable 704 refers to an instruction that is not available via the instruction register file 104, but may include additional an additional slot for a RISA reference. These loosely packable 704 instructions occupy 4 of the 5 RISA slots, and so can accept a single non-parameterized instruction register file 104 instruction. The parameterized tightly packable 706 instruction may be one that is available via a combination of the instruction register file 104 and parameterization. The parameter can refer to an entry in the immediate table 105, a short branch/jump offset, or register parameterization. Due to referencing both the instruction register file 104 entry and one immediate table 105 entry, two slots are occupied, and thus there is space for up to 3 additional RISA references. Tightly packable 708 may refers to an instruction that is available in the instruction register file 104, and does not require any parameterization. These instructions will occupy only a single slot, and thus have room for up to 4 more RISA references.

Figure 8:
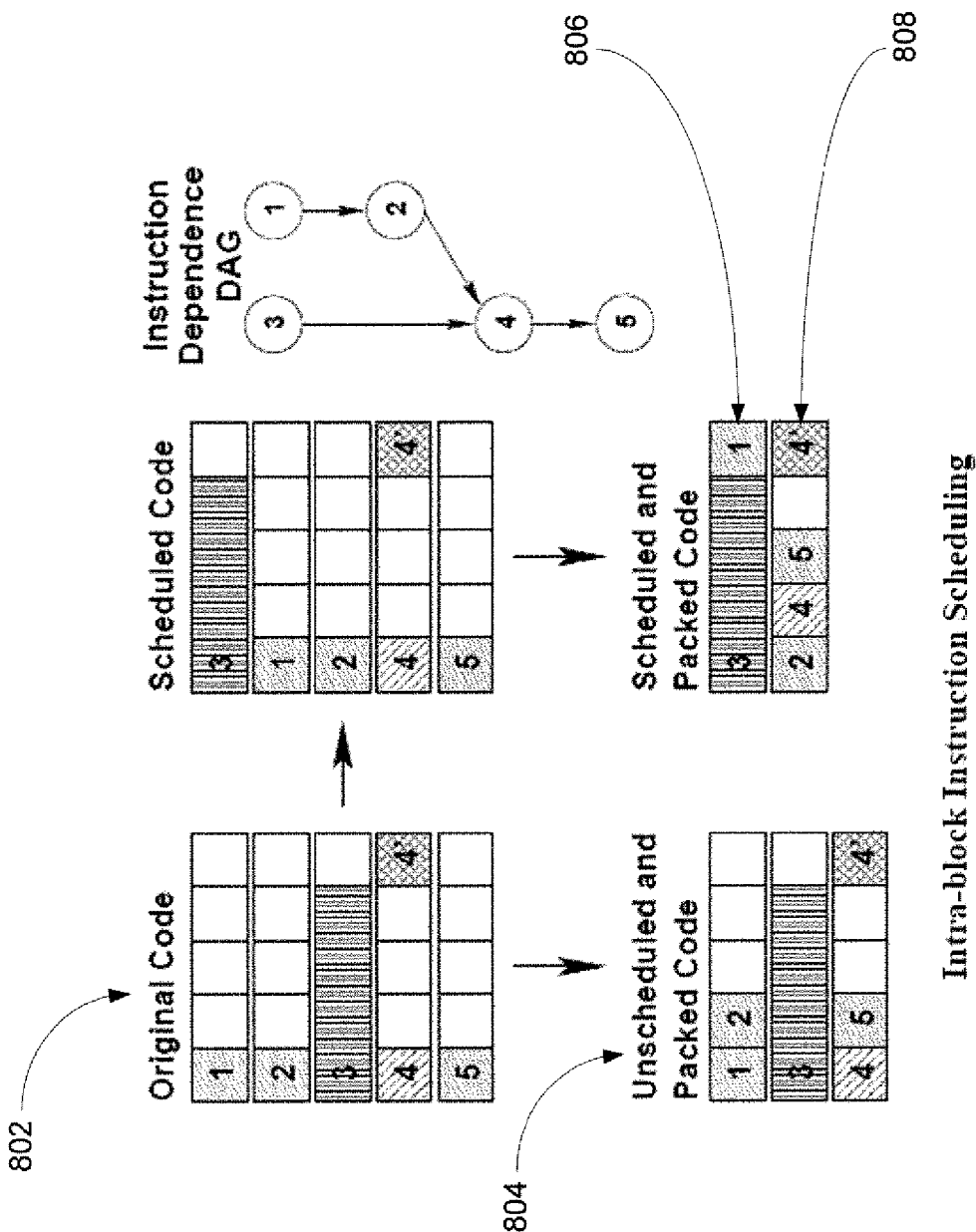
FIG. 8 illustrates exemplary intra-block instruction scheduling in accordance with an embodiment of the present invention.

FIG. 8 illustrates an exemplary intra-block instruction scheduling for improved packing efficiency in accordance with an embodiment of the present invention. The original code 802 includes five instructions, of which three are in the instruction register file (1, 2, 5), one is in the IRF with a parameter (4), and one is loosely packable 704, but not available in the IRF (3). Based on the initial packing algorithm and no scheduling, this sequence may be packed down to three total instructions 804, since instruction 3 cannot be combined effectively with any of its neighboring instructions. According to an exemplary embodiment of the present invention, the algorithm may favor loose instruction packs such that instructions 1 and 3, which are both ready at the start of the block, may be combined into a single loosely packed MISA instruction 806. Instructions 2, 4, and 5 can then be combined into a pararm3b instruction 808. With the intra-block scheduling, we can shorten this sequence down to two total instructions 806 and 808, leaving only a single instruction register file 104 slot empty.

Although conventional instruction scheduling may not include transformations that move instructions across basic blocks, instruction register file 104 packing may benefit from inter-block scheduling. Instructions may be packed using a forward sliding window and thus the final instructions in a block can be left with unused instruction register file 104 slots. Although intra-block scheduling may be an attempt to reclaim unused RISA reference slots, there are two cases where inter-block movement of instructions can lead to improved pack density. The first improvement is duplicating code for an unconditional successor block in each predecessor. Typically code duplication only serves to increase code size, but packed instructions that lead off a basic block can potentially be moved into unused slots in each predecessor. The second improvement may be the addition of instructions after a packed branch. Each of these inter-block techniques may attempt to more densely pack blocks that have already been scheduled. Although the code size may remain the same, by moving these operations earlier in the control flow graph (CFG), the ability to pack instructions in the current block may be improved. Inter-block scheduling techniques in accordance with embodiments of the present invention may be similar to filling delay slots in a RISC architecture, particularly the annulled branch feature of the SPARC. A benefit of inter-block instruction packing is that duplication of code can lead to an overall code size reduction.

Figure 9:
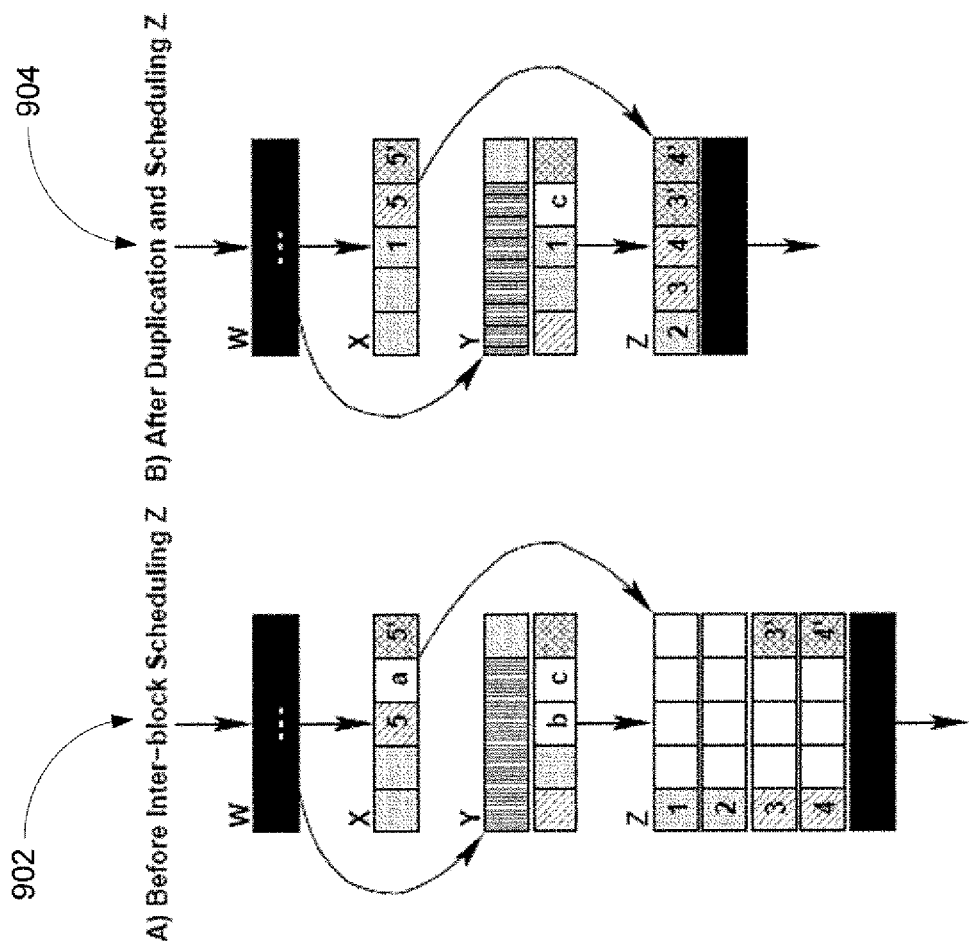
FIG. 9 illustrates an exemplary transformation of an "if-then-else" code segment in accordance with an exemplary embodiment of the present invention.

FIG. 9 illustrates an exemplary transformation of an "if-then-else" code segment in accordance with an embodiment of the present invention. Referring to sequence 902, basic blocks W, X, and Y have been scheduled, and block Z is about to be scheduled. Due to the number of tightly packable 708 and parameterized packable 706 instructions in Z, the minimum code size (disregarding any dependencies) for this block is three MISA instructions ($\lceil(4+2+5 \text{ slots})/5\rceil$). The two predecessors of Z (X and Y) have Z as their unconditional successor (fall-through or jump target). There are available RISA slots at the end of both basic blocks (slots a, b, c). Instruction 5, which occurs in block X is an example of a short jump instruction that has been converted to an unconditional branch with a parameter. Notice that for block X, the available slots are calculated without regard for the jump instruction, as the duplicated instruction will have to be placed before the jump in any case. Sequence 904 shows instruction 1 after it has been duplicated in both predecessors of Z. Instruction 1 is able to be combined in two separate tight packs. Block X shows that the moved instruction is actually placed before the jump in order to maintain correctness. After performing intra-block scheduling on block Z, the parameterized instruction 4 is packed with instructions 2 and 3. This ultimately results in a net code size reduction of one instruction.

According to an exemplary embodiment of the present invention, the baseline MIPS ISA that underlies the IRF architecture may not have support for predicated execution of instructions. With compiler transformations, however, predication may be mimicked by packing instructions after conditional branches. If a forward conditional branch is taken, then the following instructions within the pack will be skipped. If it is not taken, then they will be executed normally, just as the fall-through block normally is. Backward branches are assumed to execute the additional RISA slots only when they are taken. The baseline instruction register file 104 implementation reserves 5 bits for loosely packing each I-type instruction (except lui), and the original compiler may not support cross-block packing.

Thus, according to an exemplary embodiment of the present invention, branches may not loosely pack an additional instruction, and branches within tight packs may force termination of the pack execution. This may serves to decrease the overall packing density. Note that multiple branches or jumps together might not be packed together in order to have the branch predictor and branch target buffer to be associated with the overall MISA instruction address. One benefit of this style of predicated execution is that no additional bits in the traditional instruction formats may be required for predicates. Furthermore, these predicated instructions need not be fetched, decoded or even executed if the predicate is false.

According to another embodiment of the present invention, a conditional branch may be specified, where the conditional branch includes at least one parameter. A location of a memory instruction can be specified for the parameter. At least one instruction register file (IRF) 104 instruction can be provided following the conditional branch. Accordingly, the memory instruction will be executed if the conditional branch is taken and the IRF 104 instruction will be executed if the conditional branch is not taken.

Figure 10:
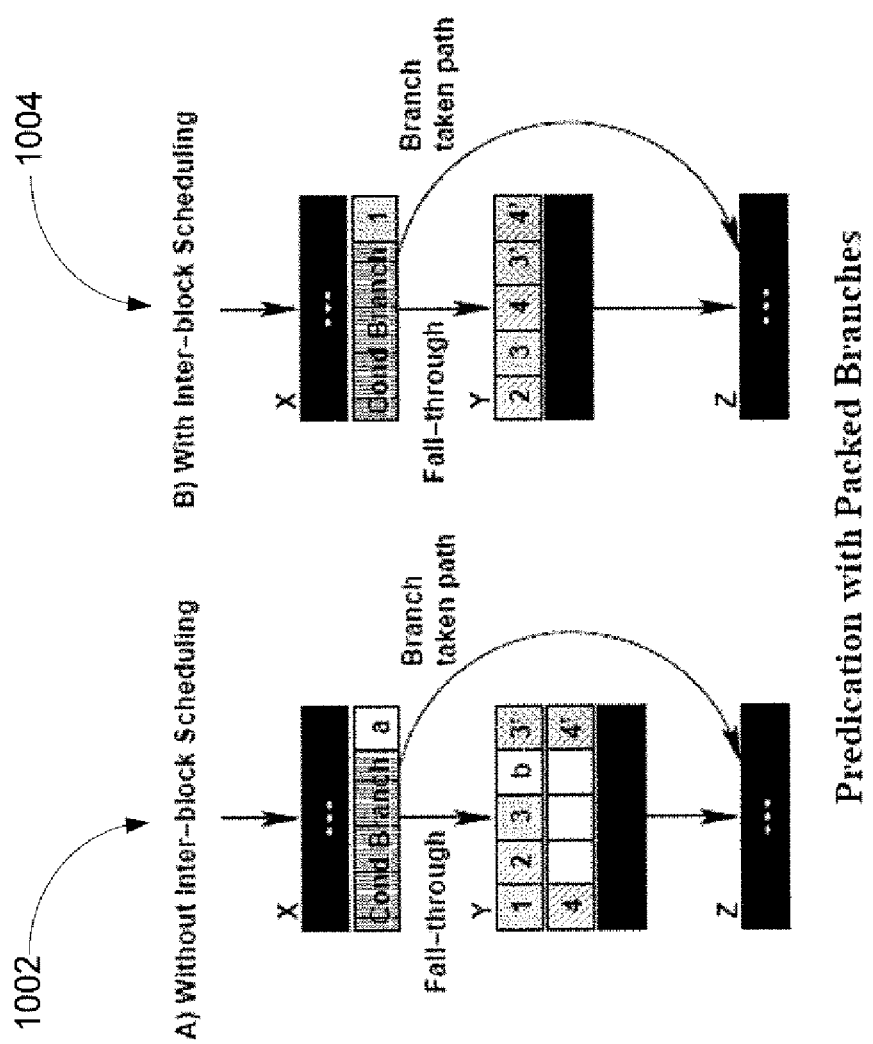
FIG. 10 illustrates exemplary benefits of predication using if-then control flow built out of packed instructions in accordance with an embodiment of the present invention.

FIG. 10 illustrates exemplary benefits of predication using a simple if-then control flow built out of packed instructions in accordance with an embodiment of the present invention. In sequence 1002, which does not have inter-block instruction scheduling, block Y consists of three MISA instructions, two of which are packed instructions, while its only predecessor (block X) contains a conditional branch with a target of block Z. The conditional branch in block X has one available RISA slot a for packing. Note that the RISA slot b is unusable since the parameterized instruction 4 requires two slots. In sequence 1004, which does perform inter-block instruction scheduling, instruction 1 is moved from block Y into the empty slot a of the conditional branch. This results in the ability for instructions 2, 3 and 4 in block Y to be packed efficiently into a single tightly packed instruction. This results in a net code size savings of one instruction.

Figure 11:
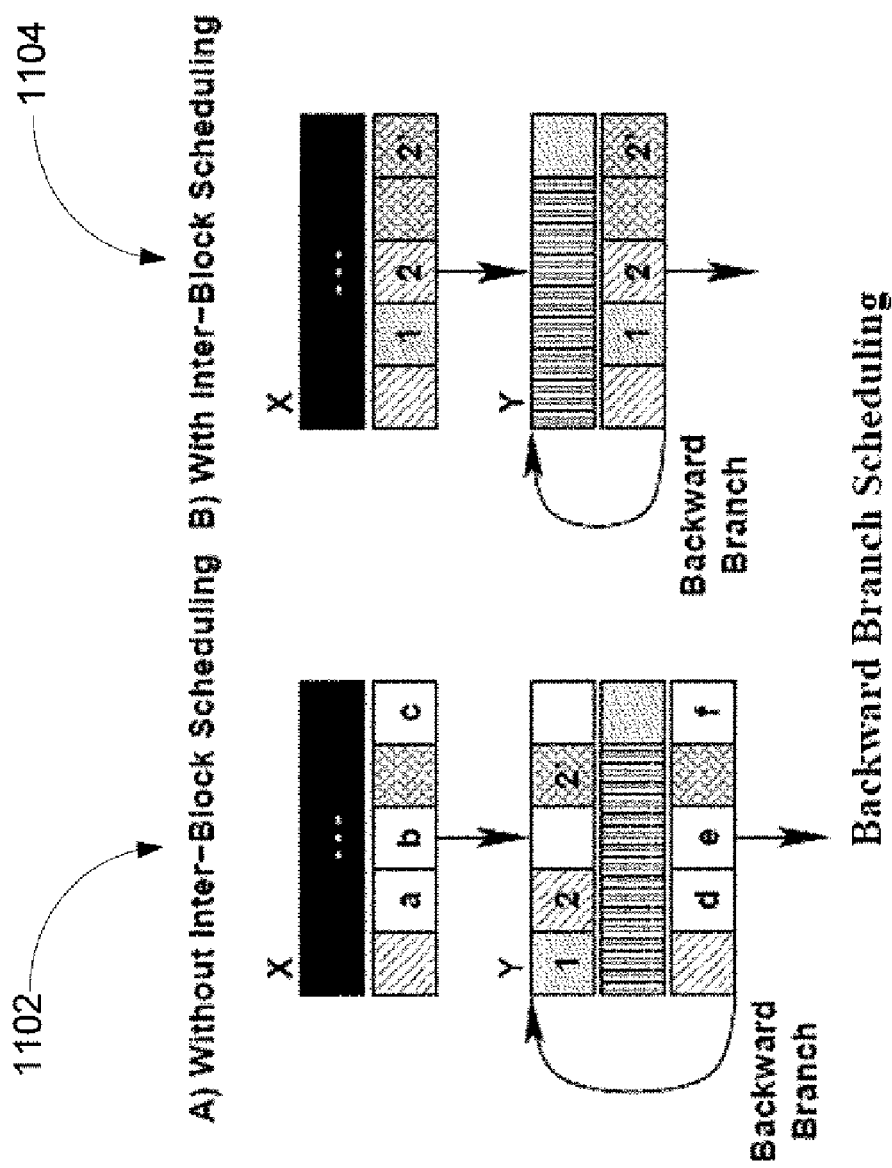
FIG. 11 illustrates an example of how instruction scheduling is used to improve pack density according to an exemplary embodiment of the present invention.

FIG. 11 illustrates an example of how instruction scheduling is used to improve pack density in the case of a backward branch in accordance with an embodiment of the present invention. In sequence 1102, block Y includes 3 MISA instructions including a backward branch back to the top of the block, while the preceding block X has a parameterized packable final instruction. The pack containing the backward branch in block Y has 3 available slots (d, e, f), and block X has 3 extra slots as well (a, b, c). Since the branch in Y is backwards, any following RISA entries will be executed only when the branch is taken. Thus, instructions 1 and 2 (along with its parameter 2') may be moved into both the loop preheader (a, b, c) and the tail of the loop (d, e, f), as shown in sequence 1104. This movement of instructions may resemble software pipelining, although additional registers are unnecessary for carrying the loop dependencies. After performing this optimization, the code size has been reduced by one MISA instruction. This transformation would be performed even if slots were unavailable in the preheader. The total code size would be the same in this instance, but the number of dynamic MISA instructions fetched would be reduced since the number of MISA instructions in the loop has been decreased.

FIG. 12 illustrates an exemplary instruction scheduling algorithm for improving pack density in accordance with an embodiment of the present invention. The algorithm starts by performing intra-block scheduling on the function entry block and all loop headers. Then, the next block is chosen that has each of its predecessors already scheduled. If such a block is not found, then the algorithm selects the next unscheduled block and performs the intra-block scheduling pass. If all predecessors of a block have been scheduled, however, then the algorithm may perform another inter-block instruction scheduling to move instructions from the current block up into each predecessor. The algorithm may first check if this block has a single predecessor that ends with a conditional branch. If the last MISA instruction in the predecessor has available RISA slots, then the algorithm attempts to choose instruction register file 104 instructions for movement into the available slots. If the block has multiple predecessors, then the algorithm may attempt to do duplication. Each predecessor block needs to have already been scheduled, have additional slots, and have the current block as their unconditional successor or branch fall-through. At this point, instruction register file 104 instructions can be moved from the current block back into each individual predecessor block. Any predecessor that is terminated by a jump will have the moved instruction register file 104 instruction placed in front of the jump, since jumps automatically terminate basic blocks and packs. Each predecessor that has instructions moved into it is then re-scheduled locally in order to see if a better packing solution exists and more slots can be freed. After all inter-block scheduling has been done, the current block is locally scheduled. By performing the inter-block scheduling early, the algorithm fills up slots in blocks that have already been scheduled. This has two benefits: reducing the number of instructions to schedule in the current block, and moving deeper, dependent instructions closer to being ready in the current block. These benefits will then allow the intra-block scheduler to do a better job of forming dense instruction packs. If this block contains a backward branch for a loop, then the algorithm attempts to move instructions into any additional slots after the backward branch. To do this, the algorithm examines all predecessors of the loop header to calculate the minimum number of available slots. At this point, the algorithm may move instructions from the loop into each predecessor block and reschedule.

D. Supporting security through Instruction Register Files

In accordance with an embodiment of the present invention, the use of an instruction register file 104 may provide for additional security against malicious attacks, including protection against malware and buffer overflow attacks. More specifically, as will be described in further detail below, the use of an instruction register file 104 may provides a level of indirection between an instruction reference and the actual instruction content.

The MISA instructions that reference the instruction register file 104 do so in packed instructions that use small indices to the instruction register file 104, such as a 5-bit index for a 32-entry instruction register file 104. In accordance with an embodiment of the present invention, this presents a viable option for implementing variation with a single software program, by permuting the placement of instructions within the instruction register file 104 for each distributed executable of the program. Assuming the processor has a 32-entry instruction register file 104 with one entry reserved to represent a nop instruction, the remaining 31 instructions can be placed in the instruction register file 104 in 31! (factorial) combinations. This pool from which unique executable versions can be created is vastly greater than the number of possible distributions. The corresponding packed instructions in the executable must be updated to use the appropriate indices; however, performing this update requires only a simple mapping. By design a significant percentage of the instructions in a program can be executed from an instruction register file 104, thus this permutation results in a substantial quantity of variation between each executable version. The actual instructions to be placed in the instruction register file 104 can be encrypted or distributed separately from the executable.

Since the only change in actual packed instructions is in indices to the instruction register file, this variation in program versions comes with absolutely no variance in the program behavior between each version, nor in the program performance on a given processor. Since the software author has knowledge of the instruction register file 104 contents and permutations distributed, there is no impact on the maintenance or packing of the versions, which are fundamentally identical in code logic. Accordingly, embodiments of the present invention may provide for an instruction register file 104 as efficient solution to software security.

In addition to providing variation, the permutation of instruction register file 104 contents also serves as obfuscation of program code, thus further thwarting analysis by malware authors. Since a significant portion of program instructions become simple instruction register file 104 index references, malware authors are denied a view of the actual instructions being executed. Malware authors must infer actual instruction contents from nameless indices that give no indication as to their purpose. Furthermore, most of the branch, jump, and return operations are likely to be packed, which makes most of the control flow within an application more difficult to detect. Hiding the control flow is recognized as one of the most effective means to obfuscate an application. And again, this comes at no penalty in performance.

Logically any instruction that exists in the instruction register file 104 should never be executed as a normal instruction, but always by reference (even in the case of single-packed instructions). By enforcing such a requirement in an instruction register file 104 system and detecting violations, malware is prevented from performing short branches, implementing system calls, and many other instructions that are the most commonly executed and so by definition will be contained within the instruction register file 104. Malware authors are thus further hindered in their task and must endeavor to determine instruction register file 104 contents, but must do so with individually unique executables.

In accordance with another embodiment of the present invention, there may also be intrusion protection module for detecting when malware is attempting to execute instruction register file 104 instructions directly and when detected, terminating execution of the program. Such intrusion protection modules may detect violations of security policy by monitoring and analyzing system behavior, which includes recognizing that the direct execution of an instruction that resides in the instruction register file 104 is anomalous (and possibly intrusive) behavioral characteristic.

According to embodiments of the present invention, the intrusion protection modules may support differentiated executables according to the many permutations of the instruction register file 104. Accordingly, the intrusion protection module would identify when instruction fetched from memory look suspicious, such as when a MISA instruction is fetched that could have been more efficiently fetched because it also resides in the instruction register file 104. The only reason this would occur is that this portion of the code was not generated by the compiler (which knows the contents of the instruction register file 104). This makes it a likely candidate for malware, and the intrusion protection module will vector to a service routine to determine the reason for the unusual behavior or to terminate the application.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method of optimizing processors, comprising:
   providing at least one instruction register file;
   identifying a plurality of frequently-used instructions;
   storing at least a portion of the identified frequently-used instructions as register instructions in the instruction register file;
   specifying a respective first identifier for identifying each of the register instructions stored within the instruction register file; and
   retrieving at least one packed instruction from an instruction cache storing packed instructions and non-packed instructions, wherein each packed instruction includes respective one or more first identifiers identifying a respective one of the register instructions stored in the instruction register file, wherein the respective one or more first identifiers are sequenced in each packed instruction according to a desired scheduling order, wherein at least one of the packed instructions includes a plurality of respective first identifiers, wherein the stored packed instructions and the non-packed instructions in the instruction cache are all of a same bit size.

2. The method of claim 1, wherein each first identifier includes an index specifying one of the register instructions stored within the instruction register file.

3. The method of claim 1, further including identifying a plurality of frequently-used immediate values and storing at least a portion of the identified frequently-used immediate values in an immediate table.

4. The method of claim 3, further including specifying a respective second identifier for identifying each of the plurality of immediate values stored in the immediate table, wherein at least one packed instruction includes a respective second identifier.

5. The method of claim 1, wherein at least one packed instruction includes a second identifier associated with the first identifier, wherein the second identifier identifies an immediate value stored in an immediate table.

6. The method of claim 1, wherein the instruction cache includes one or more of an L1 instruction cache and a ROM.

7. The method of claim 1, wherein a first format of the instructions stored in the instruction register file is different from a second format of the instructions stored in the instruction cache.

8. The method of claim 1, wherein the instruction register file includes a plurality of data registers for storing the frequently-used instructions as register instructions and wherein at least one register instruction in the instruction register file identifies a data register of the plurality of data registers by a position of a previous instruction relative to a position of a current instruction of the instruction cache.

9. The method of claim 1, wherein one of the register instructions stored in the instruction register file includes a no operation (nop) instruction.

10. The method of claim 1, wherein the instruction cache is positioned before an instruction fetch module, wherein the instruction register file is positioned after the instruction fetch module.

11. A system, comprising:
- an instruction register file, wherein a plurality of frequently-used instructions are stored as register instructions in the instruction register file, wherein each of the register instructions is identified by a respective first identifier; and
- an instruction cache that stores packed instructions and non-packed instructions, wherein each packed instruction includes respective one or more first identifiers identifying a respective one of the register instructions stored in the instruction register file, wherein the respective one or more first identifiers are sequenced in each packed instruction according to a desired scheduling order, wherein at least one of the packed instructions includes a plurality of respective first identifiers, wherein the stored packed instructions and the non-packed instructions in the instruction cache are all of a same bit size.

12. The system of claim 11, wherein each first identifier includes an index specifying one of the register instructions stored within the instruction register file.

13. The system of claim 11, further comprising:
- an immediate table that stores a plurality of frequently-used immediate values, wherein each immediate value in the immediate table is identified by a respective second identifier, wherein at least one packed instruction includes a respective second identifier.

14. The system of claim 11, wherein the instruction cache includes one or more of an L1 instruction cache and a ROM.

15. The system of claim 11, wherein a first format of the instructions stored in the instruction register file is different from a second format of the instructions stored in the instruction cache.

16. The system of claim 11, wherein the instruction register file includes a plurality of data registers for storing the frequently-used instructions as register instructions and wherein at least one register instruction in the instruction register file identifies a data register of the plurality of data registers by a position of a previous instruction relative to a position of a current instruction of the instruction cache.

17. The system of claim 11, wherein one of the register instructions stored in the instruction register file includes a no operation (nop) instruction.

18. The system of claim 11, wherein the instruction cache is positioned before an instruction fetch module, wherein the instruction register file is positioned after the instruction fetch module.

* * * * *